F. E. RICE.
BEER TAP AND BUSHING.
APPLICATION FILED JUNE 8, 1912.
1,141,269.
Patented June 1, 1915.
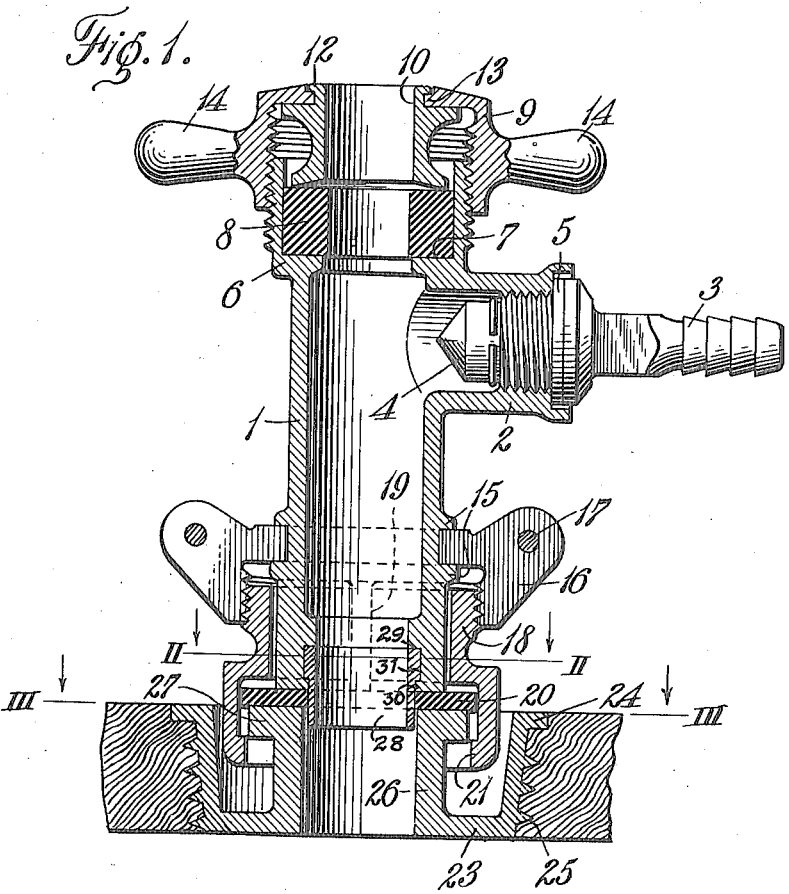
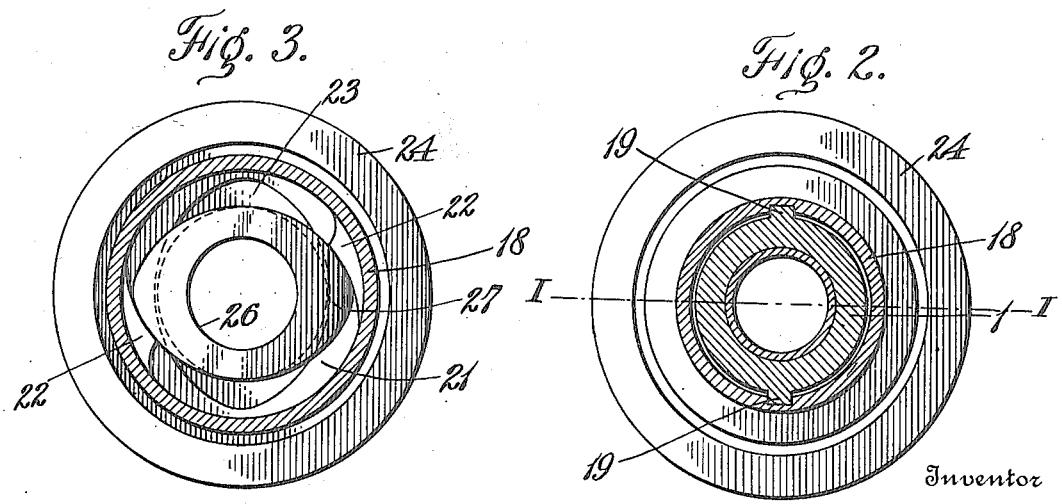
Witnesses
Chas. W. Stauffiger
Anna M. Dorr
Inventor
Frank E. Rice,
By
Attorneys

UNITED STATES PATENT OFFICE.

FRANK E. RICE, OF DETROIT, MICHIGAN, ASSIGNOR TO AMERICAN TAP BUSH CO., OF DETROIT, MICHIGAN, A CORPORATION OF MICHIGAN.

BEER-TAP AND BUSHING.

1,141,269. Specification of Letters Patent. Patented June 1, 1915.

Application filed June 8, 1912. Serial No. 702,456.

*To all whom it may concern:*

Be it known that I, FRANK E. RICE, a citizen of the United States of America, residing at Detroit, in the county of Wayne and State of Michigan, have invented certain new and useful Improvements in Beer-Taps and Bushings, of which the following is a specification, reference being had therein to the accompanying drawings.

This invention relates to a beer tap and tap bushing for making the usual connections with a beer keg or the like and to an arrangement of the parts whereby the operator can readily get the desired connection without the use of tools or the like and whereby a tight joint is insured.

The invention consists in the matters hereinafter set forth, and more particularly pointed out in the appended claim.

In the drawings, Figure 1 is a view partially in elevation and partially in longitudinal section on the line I—I of Fig. 2 of a tap and tap bush that embody features of the invention; Fig. 2 is a view in section taken on or about line II—II of Fig. 1; and Fig. 3 is a view in section taken on or about line III—III of Fig. 1.

As herein shown in preferred form a substantially cylindrical casing 1 has a lateral nipple 2 in which an outwardly closing air valve is secured for connection with pressure hose or the like. In preferred form the valve has a hose nipple 3 and an inner closure 4 of the so called Thomas type. The nipple is screwthreaded into the lug 2 and the necessary packing ring 5 is provided for insuring a tight joint. The upper end portion 6 of the casing is slightly enlarged and is provided with an inner annular seat indicated at 7 for the reception of a compression packing ring 8 of soft rubber or the like which may be forced inwardly and thereby made to tightly embrace a beer tube by means of a ring 9 that is screwthreaded on to the portion 6 and has a presser bushing 10 swiveled therein to bear against the washer 8 and compress it around an inserted tube. Preferably the presser bushing has a flange with outwardly beaded margin 12 that overlies an inner annular lug 13 of the ring and thereby retains the presser bushing in position. Radial hand holds 14 or other means are provided for convenient manipulation of the ring.

A pair of parallel guide flanges 15 encircle the lower portion of the casing and serve to loosely retain a split sleeve 16 whose sections are secured together around the casing by suitable bolts or rivets 17. The interior of the sleeve is screwthreaded for engagement with the upper screwthreaded portion of a holding member or ring 18 that is secured in nonrotatable sliding engagement with the lower portion of the casing 1 as by keys or lugs 19 engaging corresponding slots in the ring. The lower portion of the ring is counterbored to retain a packing washer or ring 20 and has an uninterrupted flange 21 so proportioned as to form an oval opening in the lower end of the ring. At the two diametrically opposite points where the flange 21 approaches its greatest width, a pair of stop lugs 22 are formed on the inner face of the ring.

A bushing 23 has an exterior flange 24 and screwthreads 25 whereby it may be inserted in a bung opening of a beer keg or the like with the outer end face thereof substantially flush with the outer face of the keg. A central opening through the bushing is encircled by a central nipple 26 having at its upper end an exterior flange 27 that corresponds in contour to the opening formed by the flange 21 on the ring 18 of the tap whereby the tap ring or holding member and the bushing may be brought into telescopic engagement with each other. The flange 27 and stops 22 are so disposed and proportioned in relation to each other and the opening formed in the flange 21 that when the holding member of the tap and the bushing are engaged and one is given a part turn, the wider portions of the flange 27 over-run the correspondingly widened portions of the flange 21, and when brought up against the stops 22, are so disposed that the major axis of the flange 27 is substantially at right angles to the major axis of the opening formed by the flange 21. When thus disposed, manipulation of the sleeve 16 locks the parts securely in position, with the washer 20 under sufficient compression to insure a tight joint.

As a further detail of construction, the tap has a tubular portion 28 adapted to enter the bore of the bushing 23. As herein shown, such portion is an inset tube with its inner end portion retained in abutment against an annular shoulder 29 in the tap by a lip 30 inturned or peened over a slight flange 31 on the tube.

As a result of this construction a tap and tap bush are obtained which may be coupled and uncoupled readily without the use of tools which are so disposed that it is impossible for the parts to become disarranged and which are simple and efficient in operation.

Obviously, changes in the details of construction may be made without departing from the spirit of the invention and I do not care to limit myself to any particular form or arrangement of parts.

What I claim is:—

In a beer tap, a casing, an annular shoulder therein, a tube extending in the end of said casing and having an annular flange against said shoulder, said casing having the end thereof peened to retain said tube against said shoulder, a holding member on the end of said casing with an inner uninterrupted flange forming an oval opening, a bushing, a nipple carried by said bushing and adapted to be telescoped by said holding member and receive the end of said tube, oppositely disposed flanges on said nipple adapted to overlie the inner flange of said holding member and interlock said member with said nipple, oppositely disposed lugs on the wide portions of the flange of said holding member and adapted to limit the interlocking action of the said member and the nipple, and a detachable washer surrounding said tube between the end of the casing and the flanged end of the nipple and engaging the inner walls of said holding member.

In testimony whereof I affix my signature in presence of two witnesses.

FRANK E. RICE.

Witnesses:
ANNA M. DORR,
C. R. STICKNEY.